(12) United States Patent
Boos et al.

(10) Patent No.: US 11,633,979 B2
(45) Date of Patent: Apr. 25, 2023

(54) METHOD FOR PRODUCING DROP CENTRE RIMS, DROP CENTRE RIM AND VEHICLE WHEEL THEREWITH FOR COMMERCIAL VEHICLES

(71) Applicant: Maxion Wheels Germany Holding GmbH, Königswinter (DE)

(72) Inventors: Achim Boos, Lohmar (DE); Jakob Schellenberg, Cologne (DE); Thomas Rang, Rheinbach (DE); Klaus Bernhard Zeyen, Vettelschoß (DE)

(73) Assignee: Maxion Wheels Germany Holding GmbH, Königswinter (DE)

( * ) Notice: Subject to any disclaimer, the term of this patent is extended or adjusted under 35 U.S.C. 154(b) by 881 days.

(21) Appl. No.: 16/332,642

(22) PCT Filed: Sep. 15, 2017

(86) PCT No.: PCT/IB2017/055596
§ 371 (c)(1),
(2) Date: Mar. 12, 2019

(87) PCT Pub. No.: WO2018/051282
PCT Pub. Date: Mar. 22, 2018

(65) Prior Publication Data
US 2021/0283949 A1    Sep. 16, 2021

(30) Foreign Application Priority Data

Sep. 16, 2016    (DE) .......................... 102016117510.2

(51) Int. Cl.
*B60B 21/02*    (2006.01)
*B21D 53/30*    (2006.01)
(Continued)

(52) U.S. Cl.
CPC ............. *B60B 21/026* (2013.01); *B21D 53/30* (2013.01); *B60B 3/044* (2013.01); *B60B 23/00* (2013.01); *B60B 3/16* (2013.01); *B60B 2310/224* (2013.01)

(58) Field of Classification Search
CPC ......... B60B 21/026; B60B 3/044; B60B 3/16; B60B 23/00; B60B 2310/224; B21D 53/30
See application file for complete search history.

(56) References Cited

U.S. PATENT DOCUMENTS 5,579,578 A * 12/1996 Ashley, Jr. ............. B21D 53/30
29/894.353
5,788,334 A    8/1998 Renard
(Continued)

FOREIGN PATENT DOCUMENTS

DE    19924062 A1    12/1999
DE    10228588 A1    1/2004
(Continued)

OTHER PUBLICATIONS

Intellectual Property India, Application No. 201947006974, dated Mar. 29, 2021.
(Continued)

*Primary Examiner* — Jason R Bellinger
*Assistant Examiner* — Emily G. Castonguay
(74) *Attorney, Agent, or Firm* — MacMillan, Sobanski & Todd, LLC

(57) ABSTRACT

A method for producing a drop centre rim and to a drop centre rim for vehicle wheels of commercial vehicles. The rim has a plurality of zones, which form an inner rim flange and an outer rim flange, an inner steep-tapered bead seat and an outer steep-tapered bead seat and a rim drop centre with a drop centre base, an inner drop centre flank and an outer
(Continued)

drop centre flank between the steep-tapered bead seats, wherein one of the zones is provided as a disc attachment region for a wheel disc, and the drop centre rim has at least one partial zone with a reduced wall thickness relative to the other zones. It is envisaged that at least one of the steep-tapered bead seats, preferably both steep-tapered bead seats, has/have a section with a wall thickness reduction of more than 20% relative to the wall thickness in the zone provided as the disc attachment region, wherein the wall thickness reduction is produced during one of the profiling steps.

14 Claims, 5 Drawing Sheets

(51) Int. Cl.
  *B60B 3/04* (2006.01)
  *B60B 23/00* (2006.01)
  *B60B 3/16* (2006.01)

(56) References Cited

U.S. PATENT DOCUMENTS

| | | | |
|---|---|---|---|
| 2004/0124695 A1 | 7/2004 | Guimard et al. | |
| 2005/0253447 A1* | 11/2005 | Abe | B60B 21/023 |
| | | | 301/95.108 |
| 2005/0280309 A1* | 12/2005 | Tanno | B60B 21/023 |
| | | | 301/95.109 |
| 2006/0123629 A1* | 6/2006 | Friese | B21D 53/30 |
| | | | 29/894.353 |
| 2009/0126443 A1 | 5/2009 | Tachi | |
| 2009/0301153 A1* | 12/2009 | Tachi | B21D 53/30 |
| | | | 72/82 |
| 2012/0086263 A1 | 4/2012 | Saito et al. | |
| 2018/0104984 A1* | 4/2018 | Lim | B60B 21/02 |

FOREIGN PATENT DOCUMENTS

| | | |
|---|---|---|
| DE | 202005021881 U1 | 2/2011 |
| IN | 12/CHE/2004 | 1/2004 |
| IN | 2492/CHE/2007 | 11/2007 |
| IN | 461/CHE/2012 | 7/2012 |
| JP | 948221 | 2/1997 |
| JP | 2000254746 A | 9/2000 |
| WO | 2009057128 A2 | 5/2009 |
| WO | 2018051282 A1 | 3/2018 |

OTHER PUBLICATIONS

PCT International Preliminary Report on Patentability, Application No. PCT/IB2017/055596, dated Mar. 19, 2019.
Japanese Office Action, Application No. 2019-510779, dated Sep. 7, 2021.
Brazilian Preliminary Office Action, Application No. BR112019002680-0, dated Jul. 16, 2021.
First Chinese Office Action, Application No. 201780057149.5, dated Mar. 16, 2020.
PCT International Search Report and Written Opinion, Application No. PCT/IB2017/055596, dated Dec. 12, 2017.
European Communication pursuant to Article 94 (3), Application No. 17772772.4, dated Jan. 27, 2020.
Korean First Office Action, Application No. 10-2019-7005553, dated May 24, 2021.

* cited by examiner

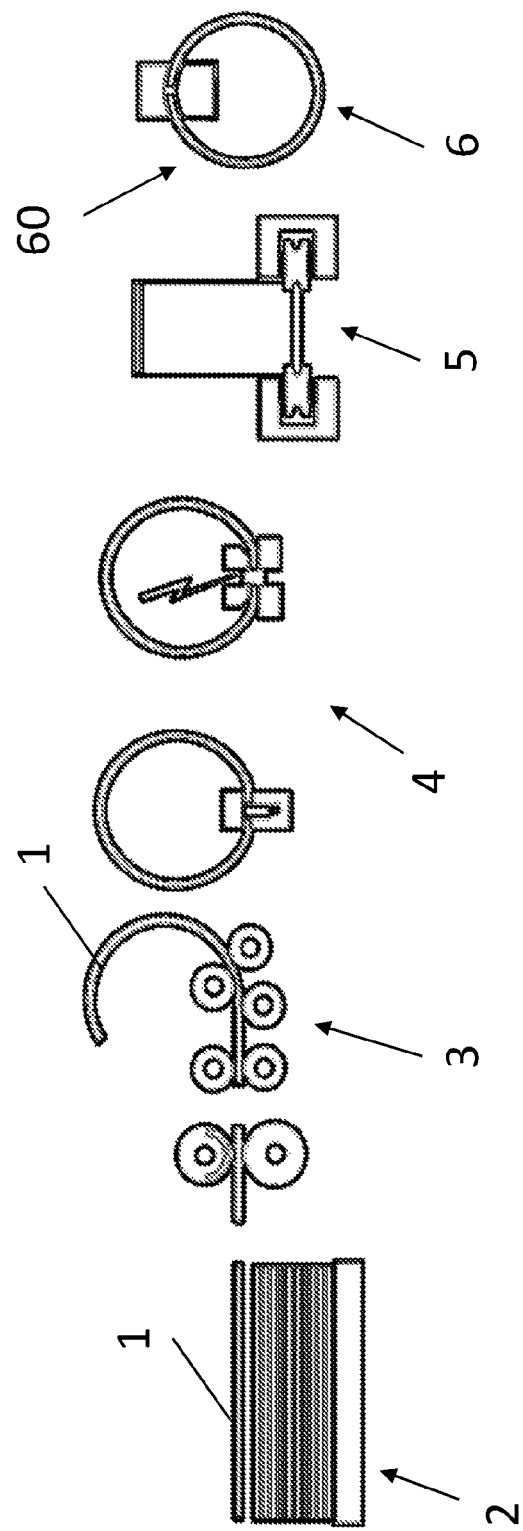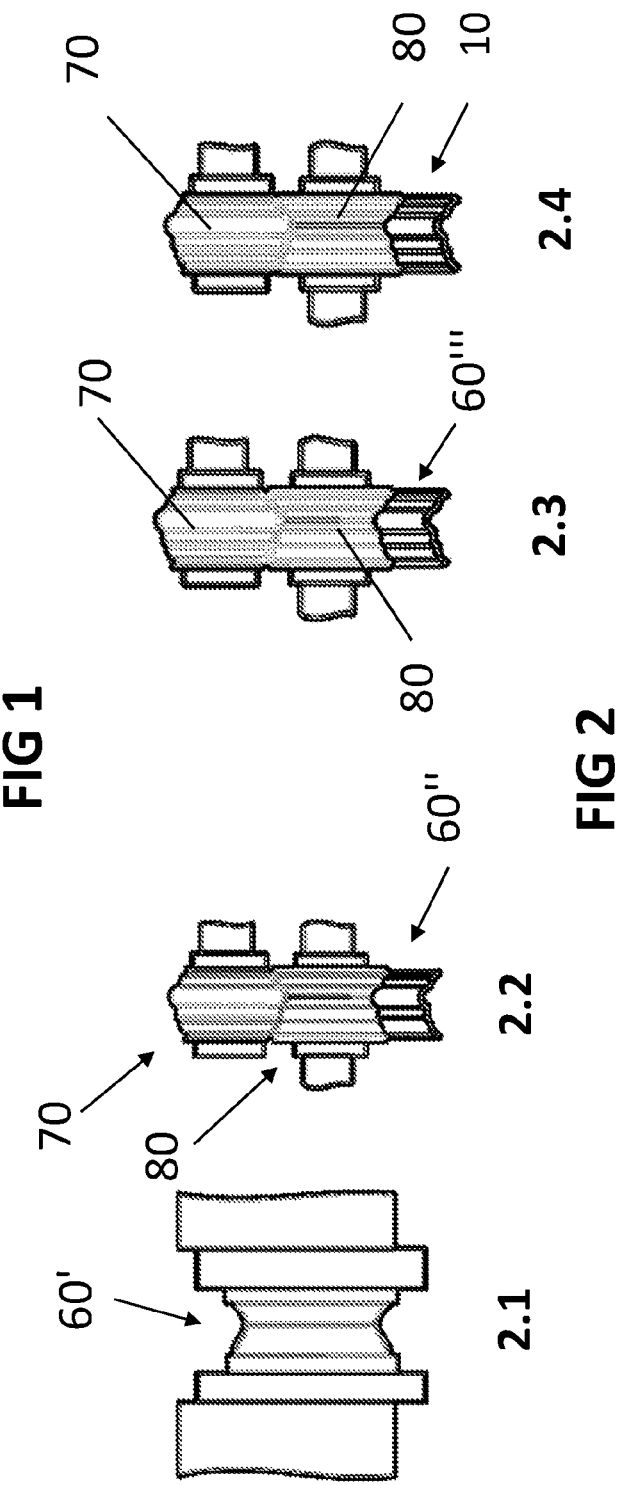
FIG 1
FIG 2

METHOD FOR PRODUCING DROP CENTRE RIMS, DROP CENTRE RIM AND VEHICLE WHEEL THEREWITH FOR COMMERCIAL VEHICLES

CROSS-REFERENCE TO RELATED APPLICATIONS

This application is a national stage of International Application No. PCT/IB2017/055596, filed 15 Sep. 2017, the disclosures of which are incorporated herein by reference in entirety, and which claimed priority to German Patent Application No. 10 2016 117 510.2, filed 16 Sep. 2016, the disclosures of which are incorporated herein by reference in entirety.

BACKGROUND TO THE INVENTION

The invention relates to a method for producing one-piece, substantially rotationally symmetrical 15° drop centre rims for vehicle wheels of commercial vehicles, having a plurality of material forming steps, in which the drop centre rim receives as zones at least one inner rim flange and one outer rim flange, an inner steep-taper bead seat and an outer steep-taper bead seat and a rim drop centre with a drop centre base, an inner drop centre flank and an outer drop centre flank between the steep-taper bead seats, wherein one of the zones is provided as a disc attachment region for a wheel disc, and wherein the material forming steps comprise at least one profiling step, and, by means of at least one of the material forming steps, the material thickness of the drop centre rim receives at least one partial zone with a reduced wall thickness relative to the other zones. The invention furthermore also relates to a drop centre rim for vehicle wheels of commercial vehicles, having a plurality of zones formed on the drop centre rim, which form an inner rim flange and an outer rim flange, an inner steep-taper bead seat and an outer steep-taper bead seat and a rim drop centre with a drop centre base, an inner drop centre flank and an outer drop centre flank between the steep-taper bead seats, wherein one of the zones is provided as a disc attachment region for a wheel disc, and the drop centre rim has at least one partial zone with a reduced wall thickness relative to the other zones. The invention furthermore also relates to a vehicle wheel for commercial vehicles, having a substantially rotationally symmetrical drop centre rim and a wheel disc that has stud holes, arranged in the interior of the drop centre rim, for fastening the vehicle wheel on a vehicle, and is connected, in particular welded, to the drop centre rim in the disc attachment region.

For many decades, commercial vehicle wheels having one-piece steel drop centre rims and welded-in wheel discs have been the standard for commercial vehicles. In many cases, corresponding commercial vehicle wheels are provided with an external valve, i.e. the valve is situated on the vehicle wheel in a space outside the wheel disc, between the outer steep steep-tapered bead seat of the rim and the outer surface of the wheel disc, which is shaped appropriately to create sufficient free space for disc brakes on the commercial vehicle. The basic structure and required dimensions of corresponding drop centre rims with 15° steep-tapered bead seats are standardized by ETRTO, for example. The basic design requirements on commercial vehicle wheels are maximum strength with minimum weight and low production costs.

To reduce weight, there is a known practice in the field of vehicle wheels to provide the rim with a reduced wall thickness or material thickness in zones which have to bear relatively low mechanical loads during the operational use of the rim or of a vehicle wheel. To this end, DE 199 24 062 A1, for example, proposes to clamp the rim blank (sheet metal ring) used to produce the rim on a cylindrical rolling mandrel before the rim profile is formed to shape by means of profiled rollers, and then to extend the blank axially by means of a spinning roller, thereby producing partial zones with a defined wall thickness reduction. The rim profile was then formed to final shape on a separate profiling machine.

DE 20 2005 021 881 U1 describes a device and a method that can be used on said device for producing rims of optimized weight, in which a spinning station is used to conically expand the rim blank, whereupon the wall thickness of the rim blank is then varied at the expanded sides of the rim blank by means of flow turning in a flow turning station following the spinning station before the end profiling is performed.

SUMMARY OF THE INVENTION

It is a feature of the invention to provide a reduced-weight commercial vehicle wheel that has a drop centre rim and can be produced in an advantageous manner.

To achieve this feature, the invention proposes a method in which the reduction in the wall thickness in the at least one partial zone takes place during the profiling step of at least one of the steep-tapered bead seats, and the steep-tapered bead seat receives a section with a wall thickness reduction of more than 20% relative to the wall thickness in the zone provided for the disc attachment region. The selective production of the wall thickness reduction in one of the profiling steps, preferably in the first profiling step after the slanting of the ring ends of the rim blank in a pre-profiling step, has the advantage that there is no need for an additional station or machine, and hence the production time can be shortened. The selective provision of a wall thickness reduction in the steep-tapered bead seats during profiling by means of profiled rollers has furthermore surprisingly shown in studies that there is a slight stress relief between the disc attachment region and the rim drop centre on the finished vehicle wheel, with the result that there is an overall improvement in the strength of a vehicle wheel produced with a drop centre rim designed correspondingly in accordance with the invention.

According to an advantageous possible procedure, only the outer steep-tapered bead seat and/or the inner steep-tapered bead seat receive/receives a wall thickness reduction of more than 20% relative to the wall thickness in the disc attachment region. As an alternative, it is possible for only the outer steep-tapered bead seat and the inner steep-tapered bead seat and the rim drop centre to receive a wall thickness reduction of more than 20% relative to the wall thickness in the zone provided for the disc attachment region. It goes without saying that other zones can likewise receive a reduced wall thickness relative to the wall thickness in the disc attachment region, but this reduction is then less than the wall thickness reduction according to the invention in the partial zones mentioned. The reduced wall thicknesses in both steep-tapered bead seats which are achieved according to the invention can be of the same magnitude or different, and the reduced wall thickness produced on the drop centre rim can also be the same magnitude as or different from the reduced wall thickness in the region of one steep-tapered bead seat or both steep-tapered bead seats.

The profiling of the sections with a reduction in the wall thickness in the steep-tapered bead seat/s is performed in a direction towards the nearest rim flange, for which purpose the sections with a wall thickness reduction on the finished vehicle wheel preferably have a conical profile and receive a larger reduction in thickness on the side closer to the drop centre base than on the side closer to the rim flange.

According to the invention, the abovementioned object is achieved, in the case of a vehicle wheel, by virtue of the fact that at least one of the steep-tapered bead seats has a section with a wall thickness reduction of more than 20% relative to the wall thickness in the zone provided as a disc attachment region. The selective wall thickness reduction in at least one of the steep-tapered bead seats in a profiling step offers the advantages mentioned above while simultaneously reducing the weight.

It is possible for just one of the bead seats to have a wall thickness reduction of more than 20% relative to the zone provided for the disc attachment region or, more advantageously, both bead seats have a wall thickness reduction of more than 20% relative to the zone provided for the disc attachment region. As an alternative, it would also be possible for only the outer steep-tapered bead seat and the inner steep-tapered bead seat and, in addition, the rim drop centre to have a wall thickness reduction of more than 20% relative to the wall thickness in the zone provided for the disc attachment region. It goes without saying that other zones can likewise receive a wall thickness reduction relative to the wall thickness in the disc attachment region, but this is then preferably less than the wall thickness reduction according to the invention in the partial zones mentioned, with the result that the smallest wall thickness in absolute terms is produced or exists in one of the two steep-tapered bead seats or in both steep-tapered bead seats and optionally in the drop centre.

The sections with a wall thickness reduction of more than 20% relative to the wall thickness in the disc attachment region preferably have a conical profile and have a larger reduction in thickness, i.e. a smaller wall thickness, on the side closer to the drop centre base, i.e. closer to the drop centre, than on the side closer to the rim flange (closer to the adjacent rim flange), wherein the slope angle in the conical region is preferably between 0.5° and 1.5°.

The maximum wall thickness reduction in the sections with a wall thickness reduction relative to an initial wall thickness of the initial sheet used to produce the drop centre rim is between 20% and 40%, preferably between 25% and 35%, and in particular between 28% and 32%, based on the initial wall thickness. The sections with a wall thickness reduction preferably merge into the zones immediately adjoining them by means of respective radii and an inflection point formed between the radii.

The drop centre rim has an upper side and a lower side, wherein the wall thickness reduction is preferably formed in the steep-tapered bead seats on the lower side. The upper side of the 15° steep-tapered bead seats forms the bearings surface for the sealing bead on the tyre on the drop centre rim and then remains flat.

The vehicle wheels produced with the drop centre rim can be twin wheels or single wheels. A transitional section for the provision of a valve hole can be provided in the transitional section between the rim drop centre and one of the steep-tapered bead seats.

A vehicle wheel according to the invention having a substantially rotationally symmetrical drop centre rim and a wheel disc that has stud holes, arranged in the interior of the drop centre rim, for fastening the vehicle wheel on a vehicle, and is connected, in particular welded, to the drop centre rim in the disc attachment region, is characterized by a one-piece drop centre rim made of steel with wall thickness reductions, produced on the sheet metal ring in one of the profiling steps, in the region of at least one of the steep-tapered bead seats, as described above.

Other advantages of this invention will become apparent to those skilled in the art from the following detailed description of the preferred embodiments, when read in light of the accompanying drawings.

BRIEF DESCRIPTION OF THE DRAWINGS

FIG. 1 shows the steps required to produce a rim blank from a sheet blank by means of a highly simplified schematic diagram;

FIG. 2 shows the steps required to produce a drop centre rim according to the invention by means of profiled rollers from a rim blank by means of a highly simplified schematic diagram;

DETAILED DESCRIPTION OF THE INVENTION

Figure 3:
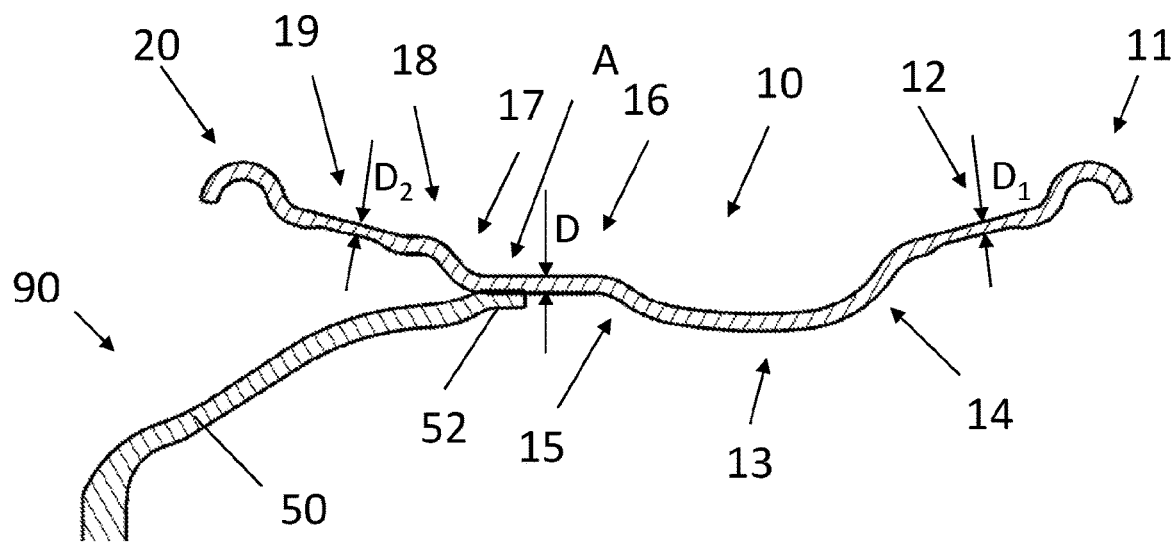
FIG. 3 shows the profile of a drop centre rim according to the invention in accordance with a first illustrative embodiment with a connected wheel disc by means of a sectional view.

FIG. 1 shows, in highly simplified schematic form, the method steps or stations for the production of a rim blank 60 for a drop centre rim according to the invention. As a starting material, use is made of a rectangular sheet blank 1 consisting of sheet steel, which is taken from a stack 2 and fed via a feed line (not shown in detail) to a circular table 3, where the sheet blank 1 is deformed by means of a plurality of rollers to give a virtually closed ring. In a following welding machine 4, the edges of the ends of the blanks, which are opposite one another after rounding, are pressed flat and then welded together in a suitable way. Preferably while still hot from welding, the rim edges of the sheet metal ring, on the one hand, as well as the weld seam are then deburred in, in this case two, deburring stations 5, 6, and the rim blank thereby formed is trimmed and rounded off, if required, giving a circular rim blank 60 (often also referred to as a ring or sheet metal ring). The above-described steps are sufficiently well known to a person skilled in the art in the production of rims or rim blanks from sheet blanks, and therefore a more detailed explanation will not be given.

The procedure according to the invention relates to the profiling of the initially cylindrical rim blank to give a drop centre rim with the profile cross section according to the invention. Here, FIG. 2 shows the profiling by means of four successive profiling steps 2.1, 2.2, 2.3, 2.4 in highly simplified schematic form, wherein profiling could also take place in several steps, as indicated by the additional profiling step 2.5 between steps 2.2 and 2.3.

In profiling step 2.1, which is actually only a pre-profiling step, the initially circular-cylindrical rim blank is expanded conically at the ends, giving a rim blank with an intermediate contour, which is correspondingly denoted by reference sign 60'. Specific zones of the subsequent rim profile are not yet present and also not recognizable at the end of the pre-profiling step. The actual profiling of the blank to give the rim then takes place in profiling steps 2.2 to 2.4 (and 2.5), wherein the mode of operation is approximately similar in each step and the stepwise forming with the intermediate shapes 60" and 60''' to give the final shape of the drop centre rim 10 is determined by the design of the forming contour of the tools used in each rolling step or profiling step, as is known per se to a person skilled in the art. In each profiling step 2.2, 2.3, 2.4, one pair of tools is used, each having a profiling mandrel or a lower roller 80, which enters and supports the blank, and an upper roller 70, by means of which the blank is pressed against the rotating lower roller 80. This too is fundamentally known to a person skilled in the art, and therefore no further explanation will be given.

The invention consists essentially in that, during at least one of the profiling steps, preferably during the first genuine profiling step 2.2, not only is a further deformation of the rim blank 60' performed but, at the same time, during this profiling step, a wall thickness reduction, at least in one of the two steep-tapered bead seats, by at least 20% relative to the material thickness in the region provided for disc attachment is also performed. For the purpose of explanation, reference is made first of all to FIG. 3, in which the profile cross section of a steep-tapered bead seat 10 according to the invention is shown together with a wheel disc 50 welded on in the disc attachment region A. In FIG. 3, reference sip 90 denotes the vehicle wheel, which consists of the drop centre rim 10, on the one hand, and the wheel disc 50, which has stud holes inter alia, wherein only a partial section of the wheel disc 50 is shown. The actual invention is manifested on the rim profile or profile cross section of the drop centre rim 10, which, as essential zones, has an inner rim flange 11, an inner steep-tapered bead seat 12 adjoining the latter, a rim drop centre 13 with an inner drop centre flank 14 and an outer drop centre flank 15, a transitional region 16, a transitional bevel 17, a mini ledge 18 (or hump) as a retaining region, an outer steep-tapered bead seat 19 and an outer rim flange 20. Here, the designations inner and outer refer to the assembled state of such a vehicle wheel 90 on a vehicle (not shown), wherein only the wheel disc 50 and the outer rim flange 20 with the outer steep-tapered bead seat 19 and the transitional bevels 17 would be visible in the assembled state, while the other regions are arranged further in on the vehicle wheel 90 and therefore are not visible. A valve hole for a valve, which would then be located on the outside, is generally arranged in the transitional region 17.

As FIG. 3 already clearly shows, both the inner steep-tapered bead seat 12 and the outer steep-tapered bead seat 19 of the drop centre rim 10 according to the invention are provided with a significant wall thickness reduction selectively produced during one of the profiling steps, wherein the zone of reduced wall thickness is situated exclusively in the region of the two steep-tapered bead seats 12, 19 by virtue of the procedure chosen.

Figure 4:
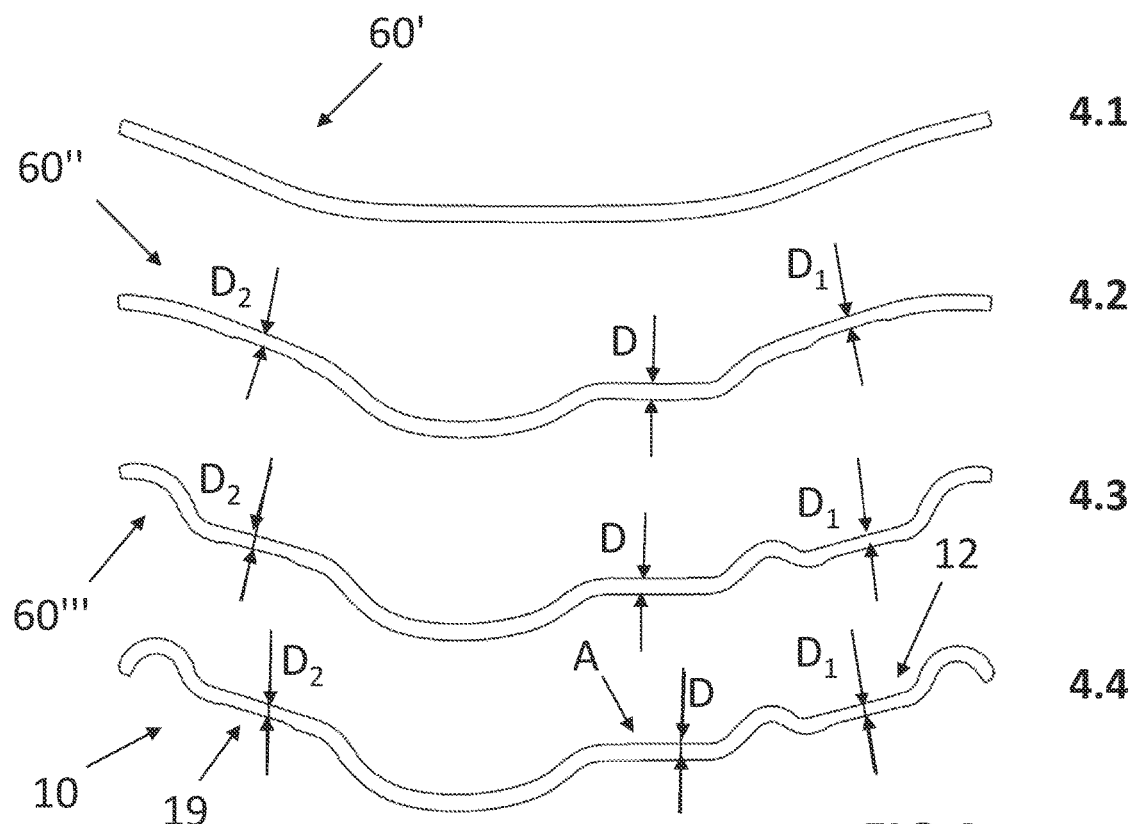
FIG. 4 shows the profile rolling steps for the production or profiling of the drop centre rim from FIG. 3 in a schematically simplified form by means of the changes in the profile cross section.

By means of the various rim blanks 60', 60", 60''' and the drop centre rim 10 as the end product, FIG. 4 shows the change in the profile cross section and the change in the profile contour during the profiling steps, wherein the profile shape and the profile cross section of the rim blank 60' in forming step 4.1 at the top corresponds to the pre-profiling step 2.1 in FIG. 2, the profile shape of the rim blank 60" in profiling step 4.2 in FIG. 4 corresponds to profiling step 2.2 in FIG. 2, the profile shape of the rim blank 60''' in profiling step 4.3 in FIG. 4 corresponds to profiling step 2.3 and the profile shape in profiling step 4.4 corresponds to profiling step 2.4 or the final contour of the drop centre rim shown in FIG. 3 and therefore is denoted by reference sign 10. During the pre-profiling process, the sheet metal ring forming the rim blank is expanded to an initial intermediate shape 60' only at the respective ends. In the first genuine profiling step, an intermediate shape 60" is produced, in which a drop centre and the transitional sections are already clearly recognizable. At the same time, respective partial areas with a significant reduction in thickness to wall thickness $D_1$ and $D_2$ relative to the wall thickness D in the other regions are produced in the upward-projecting sections, wherein these regions provided with a wall thickness reduction form steep-tapered bead seats 12 and 19, respectively, in the final contour of the drop centre rim 10 in accordance with profiling step 4.4 in FIG. 4. As the figures show very well, the rim blank 60" provided with the reductions in thickness does not undergo any further reduction in the wall thickness in the bead seats 12, 19, either in profiling step 4.3 to give the rim blank 60''' or during the subsequent final profiling step 4.4, which produces the drop centre flange 10 as the end product, this wall thickness reduction being brought about only by means of the tools in profiling step 4.2.

In the case of the vehicle wheel 90 shown in FIG. 3, the wheel disc 50 is connected by its disc rim 52 to the lower side of the transitional region 16. This section of the transitional region forms the disc attachment region for the wheel disc 50 and is therefore denoted by reference sign A for clearer illustration. The reduction in the thickness of the wall in the two steep-tapered bead seats 12, 19 is chosen in such a way, relative to the disc attachment region A, that the wall thickness $D_1$ and $D_2$ in the two steep-tapered bead seats 12, 19 is at least in part more than 20% less than the thickness D in the region of the disc attachment region A, in this case therefore in the region of the transitional section 16. This difference in thickness between the reduced-thickness regions with thicknesses $D_1$, $D_2$ and the sheet thickness D is here achieved exclusively in the first genuine profiling step 4.2. To clarify, the corresponding changes in thickness or reduced wall thicknesses $D_1$ and $D_2$ and the wall thickness D in the disc attachment region A are therefore entered in the profile cross section 4.2 shown in FIG. 4.

Figure 5:
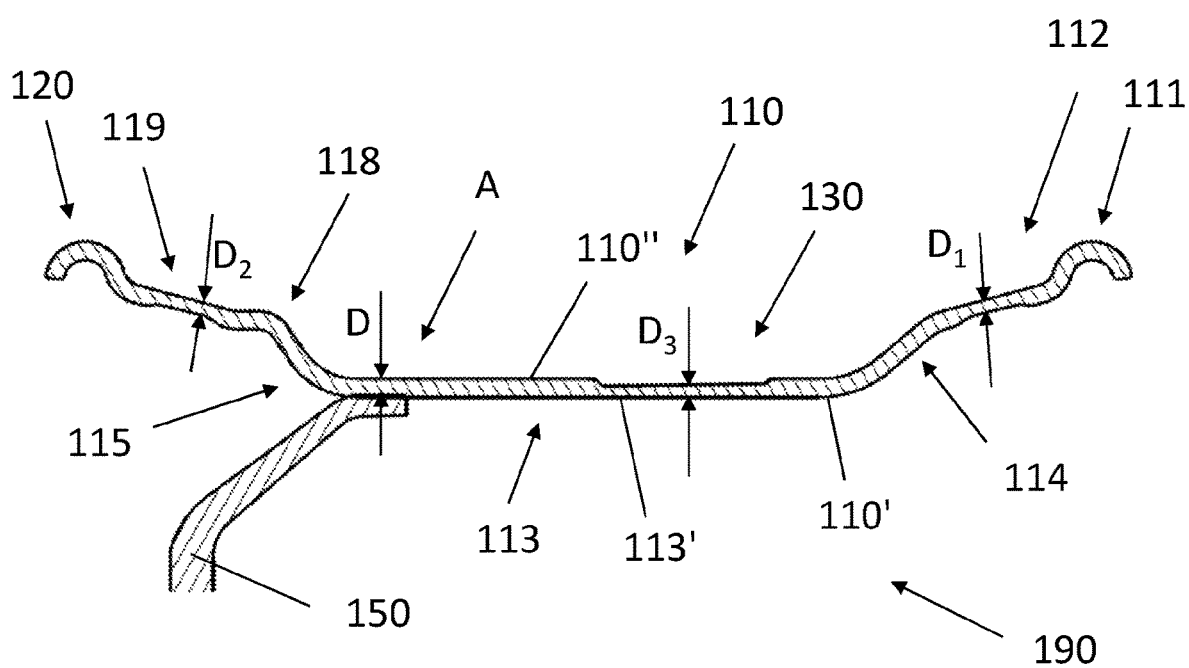
FIG. 5 shows the profile cross section of a drop centre rim according to the invention in accordance with a second illustrative embodiment with a connected wheel disc in a sectional view.

FIG. 5 shows a second illustrative embodiment of a vehicle wheel 190 having a drop centre rim 110 according to the invention. Here too, the drop centre rim 110 has an inner rim flange 111, an inner steep-tapered bead seat 112, a rim drop centre 113 with an inner drop centre flank 114 and an outer drop centre flank 115, a retaining region formed by a mini ledge 118, an outer steep-tapered bead seat 119 and an outer rim flange 120. As in the previous illustrative embodiment, both the inner steep-tapered bead seat 112 and the outer steep-tapered bead seat 119 are provided with a reduced wall thickness $D_1$ and $D_2$, wherein the minimum wall thickness $D_1$, $D_2$ in the reduced-thickness partial zones is at least 20% less than the wall thickness D of the drop centre rim 110 in the region of the disc attachment region A for the wheel disc 150. Here, the disc attachment region A is situated on the lower side 113' of the flat drop centre base 113. As a further departure from the previous illustrative embodiment, the drop centre base 113 is also provided in part with a partial zone 130 of reduced wall thickness $D_3$ in addition to the two steep-tapered bead seats 112, 119 on the vehicle wheel 190. FIG. 5 clearly shows that the steep-tapered bead seats 112, 119 are each provided on the lower side 110' with a recess on the surface, whereas, in the illustrative embodiment shown, the reduction in thickness in the drop centre 130 has been produced on the upper side 110" of the drop centre rim 110. The reason for this is illustrated particularly by FIGS. 6, 7A and 7B, in which the tools or sections of the tools for the production of the profile cross section of the drop centre rim in the first genuine profiling step are shown schematically.

Figure 6:
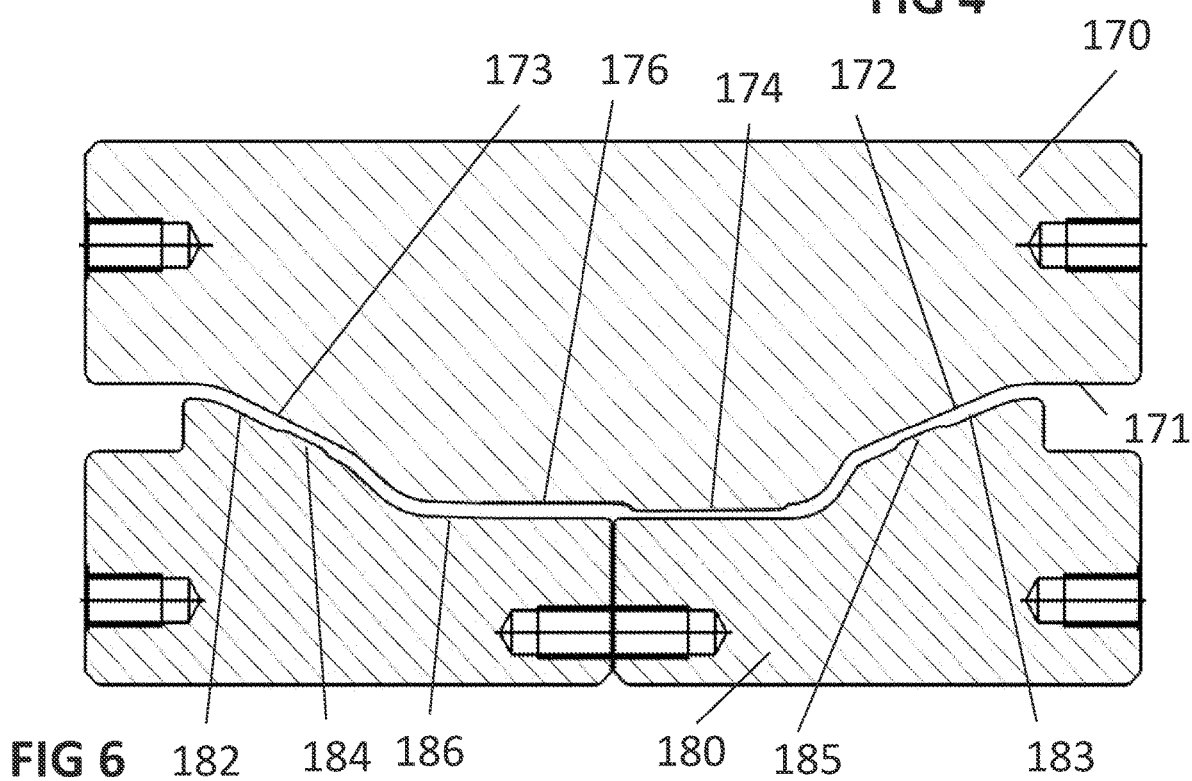
FIG. 6 shows the forming contour of profiled rollers in accordance with a first method variant for the profiling of the profile cross section of a drop centre rim according to the invention in accordance with the second illustrative embodiment as shown in FIG. 5, by means of a sectional view.

In FIG. 6, reference sign 170 once again denotes the upper roller and reference sign 180 denotes the lower roller, which is a multipart roller in this case, or the rolling mandrel. During the profiling process in a profiling machine, the sheet metal ring to be formed is situated as a rim blank between the two tools 170 and 180, wherein tool 180 in each case reaches into the sheet metal ring or rim blank and rotates, while tool 170 in each case preferably performs the feed motion. In the centre, the forming contour of the surface of the tool 180 has a flat section 186, in which the drop centre is formed and against which the lower side of the blank rests. To the side of the drop centre there are two oblique surfaces 182, 183, which are provided with a raised portion 184 and 185, respectively, in order to bring about the reductions in thickness in the region of the subsequent steep-tapered bead seats during the profiling step. Although the forming contour 171 on the opposite tools 170 likewise extends obliquely in these regions, it does so continuously in a straight line and without any raised portion, as can clearly be seen from the surfaces 172, 173 on the contour of tool 170. In the central region 176 of the forming contour 171 of tool 170, in contrast, a raised portion 174 is once again formed, ensuring the reduction in thickness in the corresponding region of the rim drop centre during the profiling step.

Figure 7A:
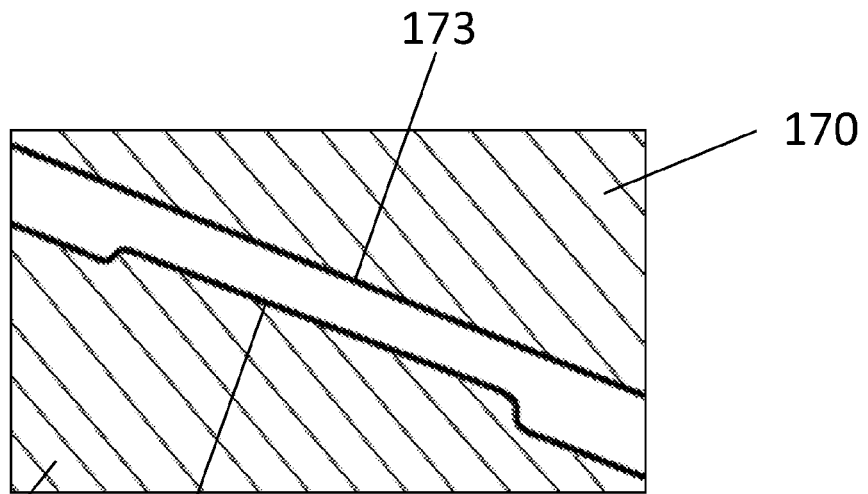
FIG. 7A shows a detail of the tool from FIG. 6 with the forming contour for the production of the material reduction or thickness reduction in one of the steep-tapered bead seats of a drop centre rim according to the invention.
Figure 7B:
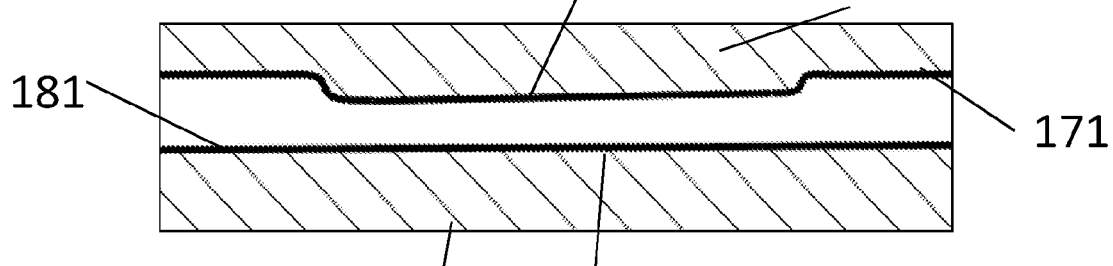
FIG. 7B shows a detail of the tool from FIG. 6 with the forming contour for the production of the material reduction in the rim drop centre of the drop centre rim shown in FIG. 5.

FIGS. 7A and 7B shows detail views of the sections on the tools 170 and 180 for producing the reductions in material thickness on the drop centre rim shown in FIG. 6. It can be seen in FIG. 7A that the raised portion 184 on tool 180 is not parallel to the opposite surface 173 on tool 170 but is at a small oblique angle, in this case about 1°. The corner of the raised portion 184 which is on the right in FIG. 7A therefore penetrates into the material of the previously expanded rim blank at a time at which the side of the raised portion 184 which is on the left in FIG. 7A is still out of contact with the surface of the blank. This measure ensures that, during the profiling step, the material is displaced outwards, i.e. towards the nearest rim flange, which, although first, is profiled later, for which reason the material reduction has a thickness which changes in a continuous manner here when viewed along its length, wherein the minimum thickness is closer to the rim drop centre than the maximum thickness in the region of the drop centre rim with a selectively reduced wall thickness.

The procedure is similar too with the rim drop centre and, here too, the raised portion 174 on tool 170 has a greater elevation relative to the adjoining surfaces on one side, in this case the left-hand side, than on the right-hand side of the raised portion 174, with the result that material is displaced to the right relative to the arrangement in FIG. 7B because the left-hand half of the raised portion 174 enters the material to be profiled earlier than the right-hand half of the raised portion 174. Unlike the case with the bead seats, however, the direction of displacement in the rim drop centre is freely selectable, even if the displacement is preferably in the direction of the closer rim flange or the direction of the shorter side.

Figure 8:
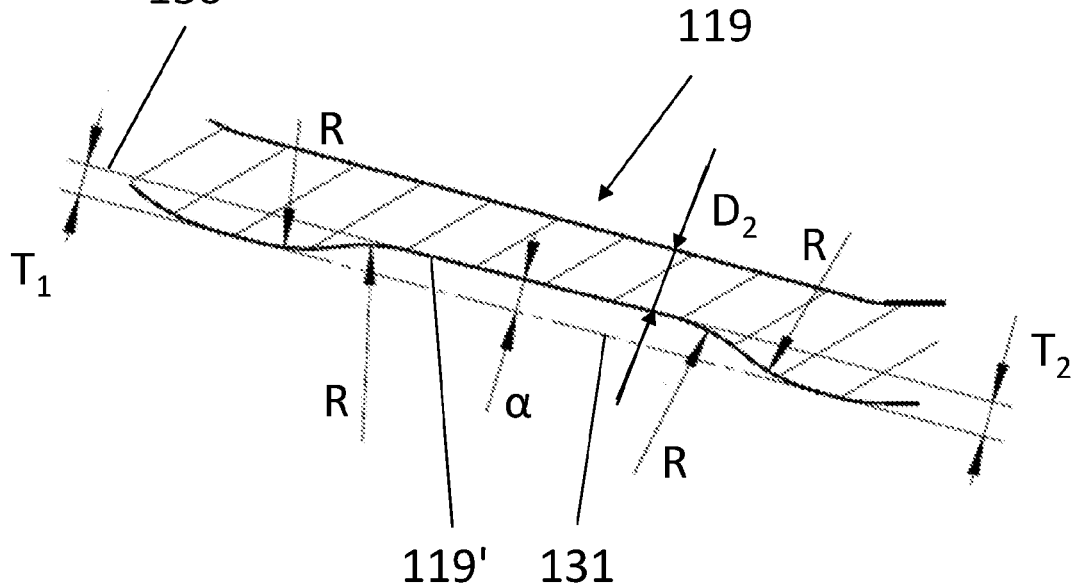
FIG. 8 shows a detail of a steep-tapered bead seat of a drop centre rim according to the invention.

FIG. 8 once again illustrates, by way of example, by means of a segment of the rim profile cross section in the region of bead seat 119, the continuously varying reduced wall thickness and the profile thereof in the region of bead seat 119. As mentioned above, the shaping of the tools means that the maximum reduction in thickness, i.e. a minimum material thickness $D_2$, on the drop centre rim is produced in the inner region of bead seat 119, that on the right in FIG. 8. Starting from this region, the material thickness increases continuously towards the closer rim flange, wherein this increase in thickness is illustrated by the angle α between a first line coinciding with the lower side 119' and a second line 131. Line 131 is flush with the surfaces in the region without a reduction in thickness and therefore corresponds to the material thickness which would be present if the reduction in thickness (or recess in the surface) had not been produced there in accordance with the invention. In accordance with the decreasing wall thickness reduction, the depth of the recess decreases continuously from the rim drop centre towards the subsequent rim flange, as is illustrated by the two depths $T_1$ and $T_2$ between lines 130 and 131, wherein depth $T_1$ is less than depth $T_2$. The transitions in the adjoining regions are in each case formed by means of radii R, as FIG. 8 illustrates, wherein there is furthermore an inflection point formed between two adjacent radii R.

Figure 9A:
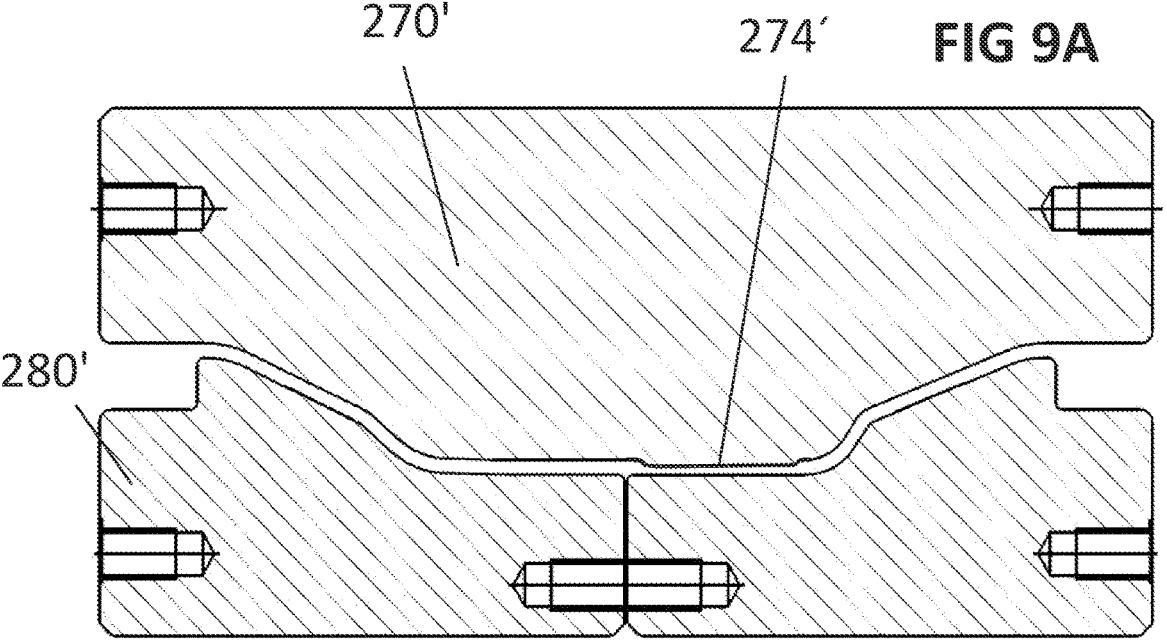
FIG. 9A shows the forming contour of profiled rollers according to a second method variant for the profiling of the profile cross section of a drop centre rim according to the invention in accordance with the second illustrative embodiment shown in FIG. 5.
Figure 9B:
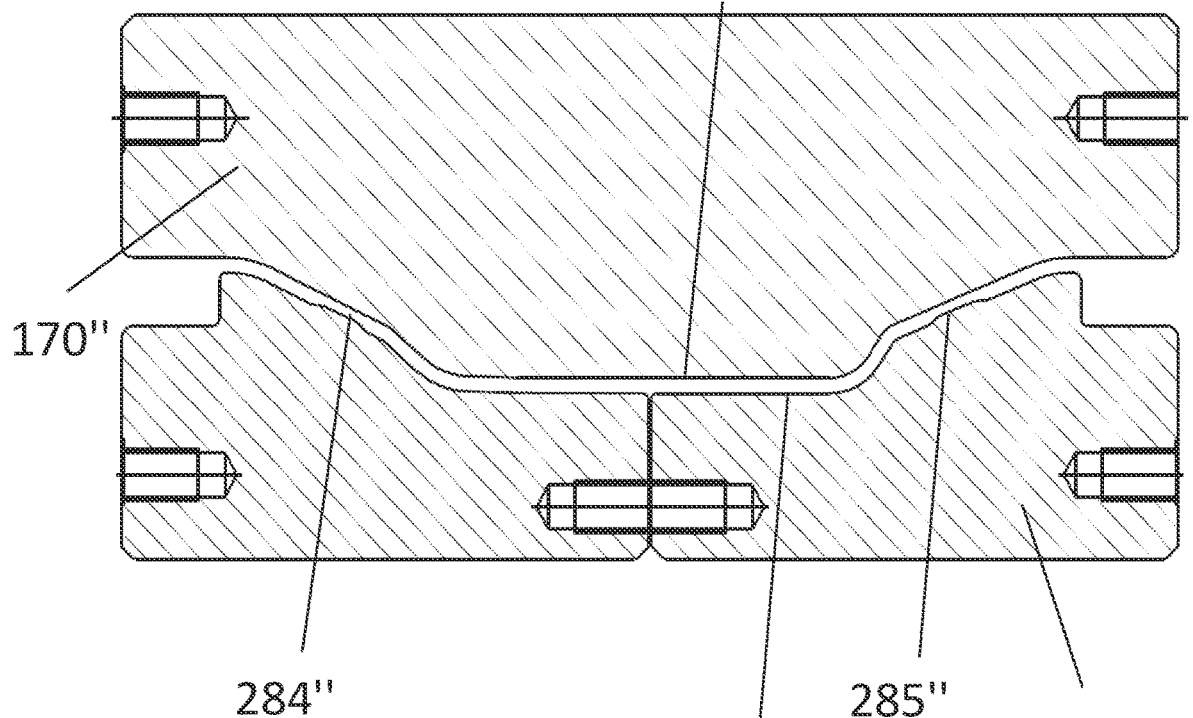
FIG. 9B shows the forming contour of profiled rollers according to another method variant for the profiling of the profile cross section of a drop centre rim according to the invention.

As already explained above, it is also possible for a plurality of profiling steps, in particular an additional profiling step (indicated by 2.5 in FIG. 2) to be provided. Even if the aim is to perform the profiling of the drop centre rim in as few profiling steps as possible, a corresponding additional profiling step could be advantageous, for example, if the drop centre rim is supposed to receive a reduction in thickness both in both steep-tapered bead seats and in the rim drop centre, as explained with reference to FIG. 5. FIG. 9A therefore shows separate tools for producing the reductions in thickness in the steep-tapered bead seats, on the one hand, and in the rim drop centre, on the other hand, in separate profiling steps. The tools 270', 280' shown above in FIG. 9A could be used in profiling step 2.2, for example, wherein, in this profiling step, only the reduction in material thickness in the region of the rim drop centre is produced by means of the tools 270', 280'. Only tool 270' therefore has a corresponding raised portion 274' on the surface contour thereof. Only in the second profiling step (2.5 in FIG. 2) would the reductions in thickness then be produced in the region of the two steep-tapered bead seats. The tool 280" used for this purpose shown in FIG. 9B correspondingly has raised portions 284", 285", whereas the rim drop centre does not undergo any further reduction in thickness or change in shape in this profiling step since the mutually opposite central regions 276", 286" are each flat.

Numerous modifications which fall within the scope of protection of the attached claims can be obtained from the above description by a person skilled in the art. The reduction in thickness in the rim drop centre could also be produced on the lower side. The reductions in thickness in both steep-tapered bead seats are preferably performed simultaneously using the same tool. The additional reduction in thickness in the region of the rim drop centre, if such a reduction is provided, can be produced by means of a tool in one method step or by means of different tools in different method steps, as explained. The respective selectively produced reduced wall thicknesses can be identical to each other or different from each other and it is sufficient if the minimum wall thickness in the regions of reduced wall thickness is smaller by the required value than in the region of the disc attachment region. The wall thickness in the disc attachment region can correspond to the initial thickness of the sheet blank used to produce the blank. However, a smaller wall thickness could also be present, especially if corresponding regions are subsequently mechanically machined. If appropriate, the tools for profiling and forming the material reductions on the 15° steep-tapered bead seats could also be granted protection separately.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method for producing one-piece, substantially rotationally symmetrical drop centre rims for vehicle wheels of commercial vehicles, having a plurality of material forming steps, in which the drop centre rim receives as zones at least one inner rim flange and one outer rim flange, an inner steep-tapered bead seat and an outer steep-tapered bead seat and a rim drop centre with a drop centre base, an inner drop centre flank and an outer drop centre flank between the inner and outer steep-tapered bead seats, wherein one of the zones is provided as a disc attachment region for a wheel disc, and wherein the material forming steps comprise at least one profiling step, and, by means of at least one of the material forming steps, a material thickness of the drop centre rim receives at least one partial zone with a reduced wall thickness relative to the other zones, wherein the reduced wall thickness in the at least one partial zone takes place during the profiling step of at least one of the steep-tapered bead seats, wherein solely the outer steep-tapered bead seat and/or the inner steep-tapered bead seat receive/receives a wall thickness reduction of more than 20% relative to a wall thickness in the disc attachment region, or in that only the outer steep-tapered bead seat and the inner steep-tapered bead seat and the rim drop centre receive a wall thickness reduction of more than 20% relative to the wall thickness in the zone provided for the disc attachment region.

2. A method for producing one-piece, substantially rotationally symmetrical drop centre rims for vehicle wheels of commercial vehicles, having a plurality of material forming steps, in which the drop centre rim receives as zones at least one inner rim flange and one outer rim flange, an inner steep-tapered bead seat and an outer steep-tapered bead seat and a rim drop centre with a drop centre base, an inner drop centre flank and an outer drop centre flank between the inner and outer steep-tapered bead seats, wherein one of the zones is provided as a disc attachment region for a wheel disc, and wherein the material forming steps comprise at least one profiling step, and, by means of at least one of the material forming steps, a material thickness of the drop centre rim receives at least one partial zone with a reduced wall thickness relative to the other zones, wherein the reduced wall thickness in the at least one partial zone takes place during the profiling step of at least one of the steep-tapered bead seats, wherein the profiling of the section with a reduction in the wall thickness in the at least one steep-tapered bead seat is performed in a direction towards the nearest rim flange.

3. The method according to claim 2, wherein by a transitional section between the rim drop centre and one of the steep-tapered bead seats is provided for the provision of a valve hole in the transitional section.

4. A drop centre rim for vehicle wheels of commercial vehicles, having a plurality of zones, which form an inner rim flange and an outer rim flange, an inner steep-tapered bead seat and an outer steep-tapered bead seat and a rim drop centre with a drop centre base, an inner drop centre flank and an outer drop centre flank between the steep-tapered bead seats, wherein one of the zones is provided as a disc attachment region for a wheel disc, and the drop centre rim has at least one partial zone with a reduced wall thickness relative to the other zones, wherein only one bead seat or only both bead seats has/have a wall thickness reduction of more than 20% relative to a wall thickness in the zone provided for the disc attachment region, or in that only the outer steep-tapered bead seat and the inner steep-tapered bead seat and the rim drop centre have a wall thickness reduction of more than 20% relative to the wall thickness in the zone provided for the disc attachment region.

5. A drop centre rim for vehicle wheels of commercial vehicles, having a plurality of zones, which form an inner rim flange and an outer rim flange, an inner steep-tapered bead seat and an outer steep-tapered bead seat and a rim drop centre with a drop centre base, an inner drop centre flank and an outer drop centre flank between the steep-tapered bead seats, wherein one of the zones is provided as a disc attachment region for a wheel disc, and the drop centre rim has at least one partial zone with a reduced wall thickness relative to the other zones, wherein the sections with a wall thickness reduction of more than 20% relative to the wall thickness in the disc attachment region have a conical profile and receive a larger reduction in thickness on the side closer to the drop centre base than on the side closer to the rim flange.

6. The drop centre rim according to claim 5, wherein a maximum wall thickness reduction in the sections with a wall thickness reduction relative to an initial wall thickness of an initial sheet used to produce the drop centre rim is between 20% and 40%, based on the initial wall thickness.

7. The drop centre rim according to claim 5, wherein the drop centre rim has an upper side and a lower side, wherein the wall thickness reduction is formed in the steep-tapered bead seats on the lower side.

8. A vehicle wheel for commercial vehicles, having a substantially rotationally symmetrical drop centre rim and a wheel disc that has stud holes, arranged in the interior of the drop centre rim, for fastening the vehicle wheel on a vehicle, and is connected, in particular welded, to the drop centre rim in the disc attachment region, wherein the drop centre rim is designed in accordance with claim 5.

9. The drop centre rim according to claim 5, wherein a slope angle in the conical region is between 0.5° and L5°.

10. The drop centre rim according to claim 5, wherein a maximum wall thickness reduction in the sections with a wall thickness reduction relative to an initial wall thickness of an initial sheet used to produce the drop centre rim is between 25% and 35%, based on the initial wall thickness.

11. The drop centre rim according to claim 5, wherein a maximum wall thickness reduction in the sections with a wall thickness reduction relative to an initial wall thickness of an initial sheet used to produce the drop centre rim is between 28% and 32%, based on the initial wall thickness.

12. The drop centre rim according to claim 5, wherein by a transitional section between the rim drop centre and one of the steep-tapered bead seats for the provision of a valve hole in the transitional section.

13. A drop centre rim for vehicle wheels of commercial vehicles, having a plurality of zones, which form an inner rim flange and an outer rim flange, an inner steep-tapered bead seat and an outer steep-tapered bead seat and a rim drop centre with a drop centre base, an inner drop centre flank and an outer drop centre flank between the steep-tapered bead seats, wherein one of the zones is provided as a disc attachment region for a wheel disc, and the drop centre rim has at least one partial zone with a reduced wall thickness relative to the other zones, wherein the sections with a wall thickness reduction merge into the zones immediately adjoining them by means of respective radii and an inflection point formed between the radii.

14. A method for producing one-piece, substantially rotationally symmetrical drop centre rims for vehicle wheels of commercial vehicles, having a plurality of material forming steps, in which the drop centre rim receives as zones at least one inner rim flange and one outer rim flange, an inner steep-tapered bead seat and an outer steep-tapered bead seat and a rim drop centre with a drop centre base, an inner drop centre flank and an outer drop centre flank between the inner and outer steep-tapered bead seats, wherein one of the zones is provided as a disc attachment region for a wheel disc, and wherein the material forming steps comprise at least one profiling step, and, by means of at least one of the material forming steps, a material thickness of the drop centre rim receives at least one partial zone with a reduced wall thickness relative to the other zones, wherein the reduced wall thickness in the at least one partial zone takes place during the profiling step of at least one of the steep-tapered bead seats, wherein the sections with a wall thickness reduction have a conical profile and receive a larger reduction in thickness on the side closer to the drop centre base than on the side closer to the rim flange.

* * * * *